US006482021B2

(12) United States Patent
Hara et al.

(10) Patent No.: US 6,482,021 B2
(45) Date of Patent: Nov. 19, 2002

(54) STRUCTURE OF WATERPROOF PORTION OF WATERPROOF CONNECTOR

(75) Inventors: Terufumi Hara, Shizuoka-ken (JP); Takao Murakami, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/984,197

(22) Filed: Oct. 29, 2001

(65) Prior Publication Data

US 2002/0052143 A1 May 2, 2002

(30) Foreign Application Priority Data

Oct. 30, 2000 (JP) ........................................ 2000-331222

(51) Int. Cl.[7] .............................................. H01R 13/52
(52) U.S. Cl. ........................ 439/279; 439/587; 439/606
(58) Field of Search .................................. 439/279, 271, 439/274, 275, 276, 587, 281, 278, 606

(56) References Cited

U.S. PATENT DOCUMENTS

| 2,710,385 | A | * | 6/1955 | Sprigg ........................ 439/281 |
| 3,643,208 | A | * | 2/1972 | Massa, Jr. .................... 439/606 |
| 4,961,713 | A | * | 10/1990 | McCracken et al. .......... 29/858 |
| 5,197,898 | A | * | 3/1993 | Nagamine .................... 439/271 |
| 5,660,555 | A | * | 8/1997 | Ito et al. ...................... 439/278 |
| 5,823,811 | A | * | 10/1998 | Blanchfield et al. ......... 437/274 |
| 5,984,724 | A | * | 11/1999 | McNeel ....................... 439/606 |

FOREIGN PATENT DOCUMENTS

JP          61-179077          8/1986

* cited by examiner

*Primary Examiner*—Gary Paumen
*Assistant Examiner*—James R. Harvey
(74) *Attorney, Agent, or Firm*—Finnegan, Henderson, Farabow, Garrett & Dunner, L.L.P.

(57) ABSTRACT

A structure of a waterproof portion of a waterproof connector comprising: an inner housing 14 provided with a terminal chamber 12; an outer housing 18 provided with an enter port 16 receiving an opposite connector 30 at a tip thereof, the outer housing having the inner housing 14 engaged therewith; an interconnector waterproof portion 20 liquid-tightly sealing a space with the opposite connector 30, the inter connector waterproof portion being provided in the outer housing 18; and a wire waterproof portion 24 covering a connection portion of a wire 22 protruding outward from the terminal chamber 12, wherein a communication path 36 communicating between the interconnector waterproof portion 20 and the wire waterproof portion 24 is provided, and the interconnector waterproof portion 20 and the wire waterproof portion 24 are continuously formed by monolithic molding using thermoplastic resin 38 through the communication path 36.

2 Claims, 4 Drawing Sheets

INJECT THERMOPLASTIC POLYAMIDE RESIN

STRUCTURE OF WATERPROOF PORTION OF WATERPROOF CONNECTOR

BACKGROUND OF THE INVENTION

The present invention relates to a structure of a waterproof portion of a waterproof connector, which is adapted to waterproof an inside of a connector housing by providing a waterproof portion such as an interconnector waterproof portion and a wire waterproof portion.

As a conventional waterproof connector, for example, mentioned is the one disclosed in the gazette of Japanese Patent Laid-Open No. S 61(1986)-179077 and shown in FIGS. 1 and 2, which is provided with a packing 6 functioning as an interconnector waterproof portion and a: rubber stopper 6a functioning as a wire waterproof portion. FIG. 1 is an exploded perspective view showing a waterproof connector 1 and an opposite connector 2 opposite thereto, which constitute a pair and are mutually assembled.

As shown in FIGS. 1 and 2, the waterproof connector 1 is constructed in such a manner that a specified space S is provided in an inside of an outer housing 3, an inner housing 5 accommodating a connection terminal 4a of one wire 4 is protrusively provided therein, and the rubber-made packing 6 is inserted between the outer housing 3 and the inner housing 5. Moreover, the rubber stopper 6a is provided behind the connection terminal 4a. By the rubber stopper 6a, a terminal chamber 5a of the inner housing 5 is (liquid-tightly) sealed.

Meanwhile, as shown in FIG. 1, the opposite connector 2 is constructed in such a manner that a housing 7 plugged into the specified space S is provided, and a connection terminal 8a of the other wire 8 is accommodated in a rear end of the housing 7. Note that, the connection terminals 8a and 4a are adapted to be latched on the housing 7 and the inner housing 5 by spacers 9 and 9a.

Then, the housing 7 of the opposite connector 2 is plugged into the specified space S of the waterproof connector 1; therefore, the one connection terminal 4a and the other connection terminal 8a come into contact with each other, and the packing 6 is pressed toward a direction of a bottom wall 3a of the outer housing 3 by a step portion (not shown) formed on an inside of a tip of the housing 7. Accordingly, the packing 6 is compressed between the bottom wall 3a and the step portion to be expanded to a thickness direction of the outer housing 3, thus being adapted to seal a space between an outer peripheral surface of the inner housing 5 and an inner peripheral surface of the housing 7.

However, in the conventional waterproof connector 1 described above, the packing 6 and the rubber stopper 6a are provided as parts independent of each other. Therefore, the number of parts of the whole waterproof connector is increased, and extra steps of assembling the packing 6 and the rubber stopper 6a are required. Accordingly, productivity of the product is lowered, leading to an inevitable increase in cost of the waterproof connector 1.

SUMMARY OF THE INVENTION

The present invention was made in order to solve the foregoing conventional subjects. The present invention has an object to provide a structure of a waterproof portion of an inexpensive waterproof connector capable of achieving reduction in number of parts and in number of assembling steps by monolithically molding an interconnector waterproof portion and a wire waterproof portion.

The invention of claim 1 is a structure of a water proof portion of a waterproof connector comprising: an inner housing provided with a terminal chamber; an outer housing provided with an enter port receiving an opposite connector at a tip thereof, the outer housing having the inner housing engaged therewith; an interconnector waterproof portion sealing a space thereof with the opposite connector, the interconnector waterproof portion being provided in the outer housing; and a wire waterproof portion covering a connection portion of a wire protruding outward from the terminal chamber, wherein a communication path communicating between the interconnector waterproof portion and the wire waterproof portion is provided, and the interconnector waterproof portion and the wire waterproof portion are continuously formed by monolithic molding using thermoplastic resin through the communication path.

In accordance with the structure of the waterproof portion of the waterproof connector, since the interconnector waterproof portion and the wire waterproof portion are continuously formed by the monolithic molding using the thermoplastic resin, the interconnector waterproof portion and the wire waterproof portion are formed as one part, thus the number of parts of the whole waterproof connector is reduced. Moreover, since the interconnector waterproof portion and the wire waterproof portion are formed in a lump by the monolithic molding, the number of assembling steps is reduced, and cost reduction is achieved for this amount.

The invention of claim 2 is the structure of the waterproof portion of the waterproof connector according to claim 1, wherein the wire waterproof portion is formed in such a manner that the whole from a connection portion of the wire to a rear end of the outer housing is covered with the thermoplastic resin.

In accordance with the structure of the waterproof portion of the waterproof connector, since the whole from the connection portion of the wire to the rear end of the outer housing can be covered with the wire waterproof portion, the wire waterproof portion covers wholly not only the connection portion of the wire but also the vicinity of the terminal chamber of the inner housing. Thus, a waterproof function of the portion covered by the wire waterproof portion can be increased, and the bond strength between the inner housing and the outer housing can be increased.

DETAILED DESCRIPTION OF THE PREFERRED EMBODIMENTS

Hereinafter, description will be made in detail for an embodiment of the present invention with reference to the drawings.

Figure 1:
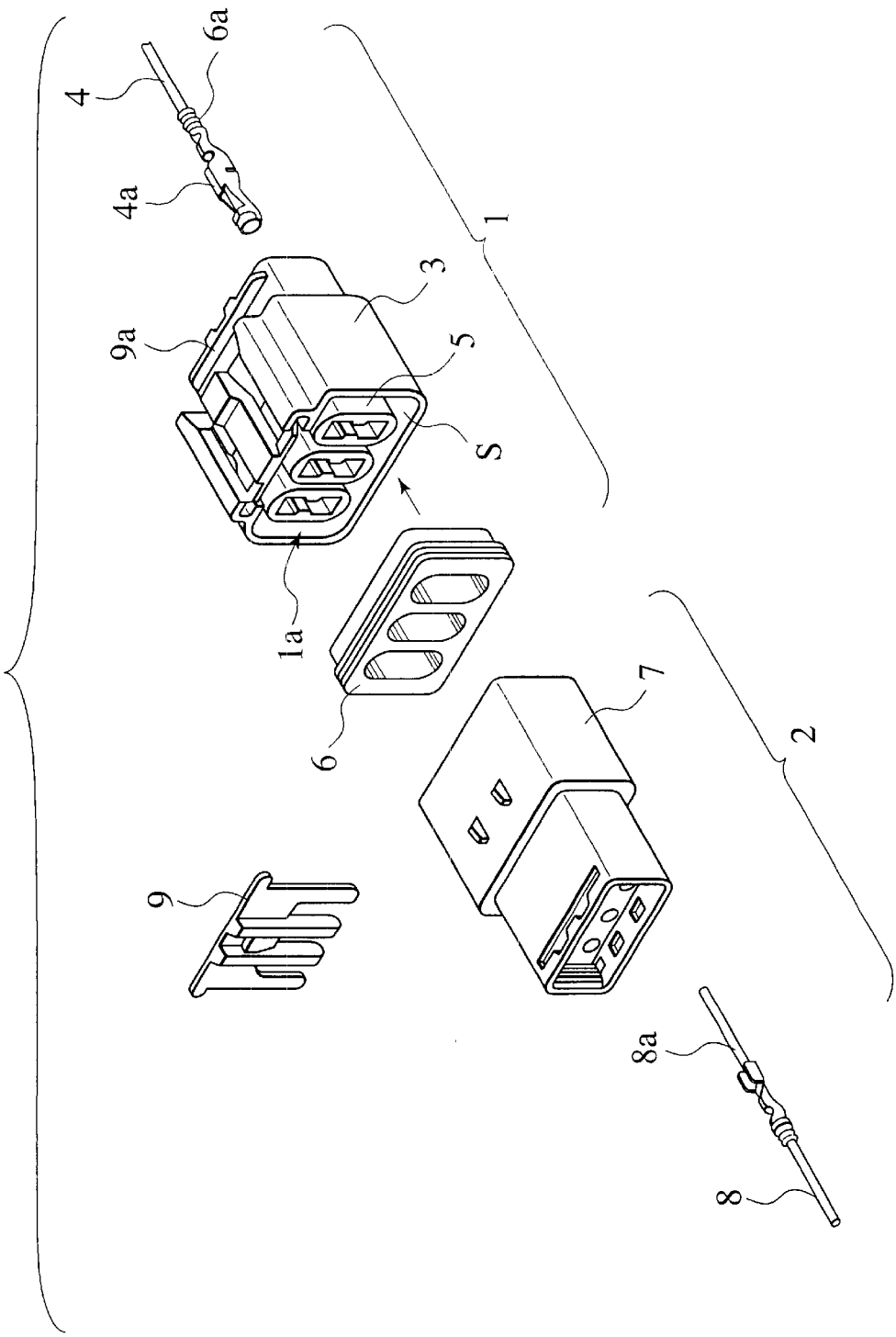
FIG. 1 is an exploded perspective view of a conventional waterproof connector.
Figure 2:
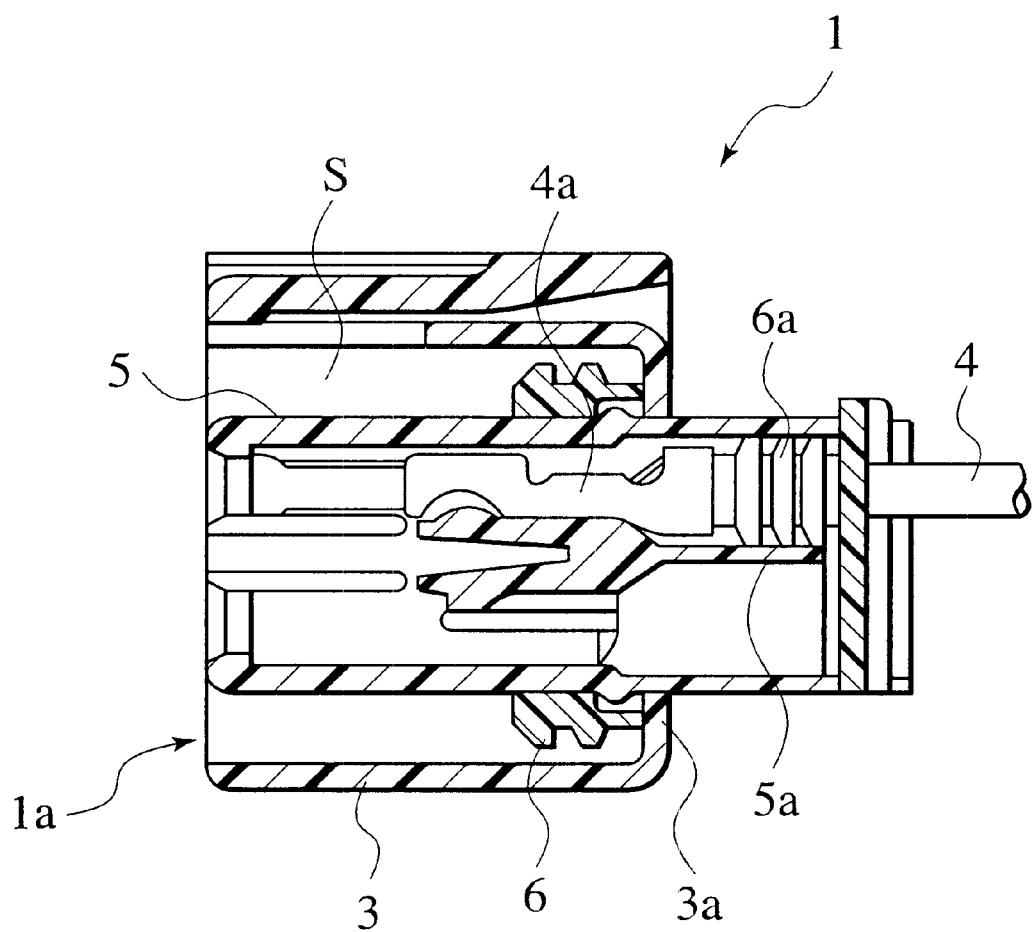
FIG. 2 is a sectional view of an assembled state of the conventional waterproof connector.
Figure 3:
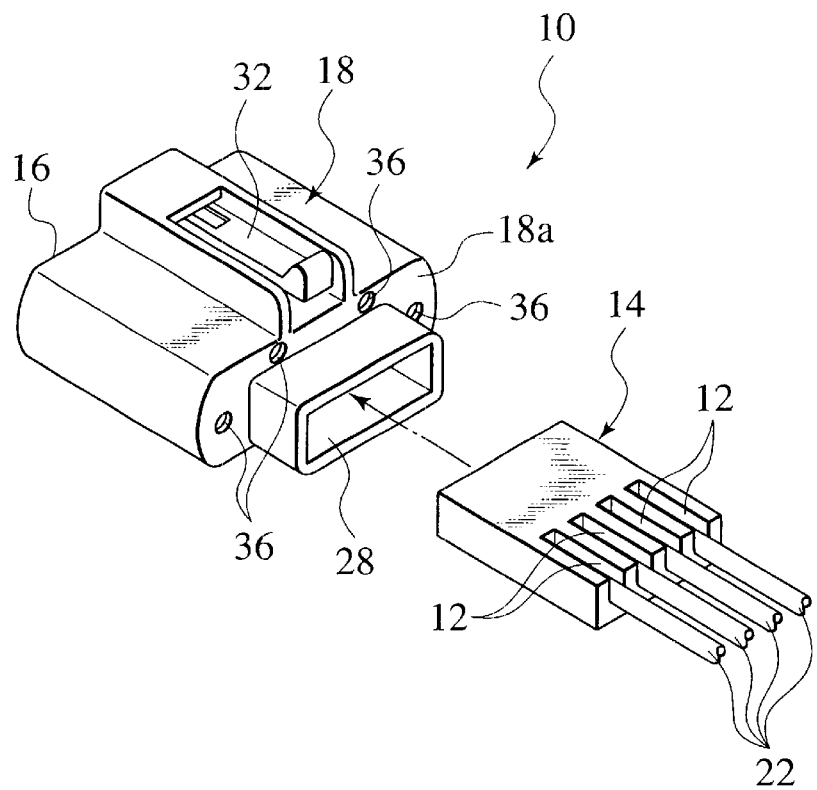
FIG. 3 is an exploded perspective view showing a waterproof connector of one embodiment of the present invention.
Figure 4:
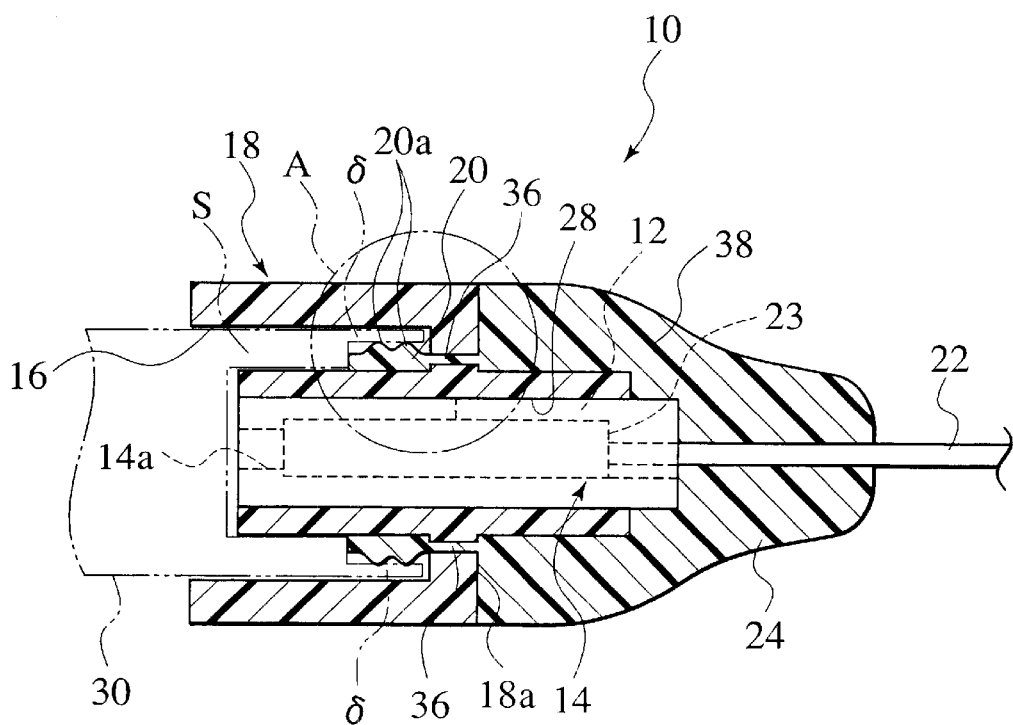
FIG. 4 is a sectional view showing an assembled state of the waterproof connector of the embodiment of the present invention.
Figure 5:
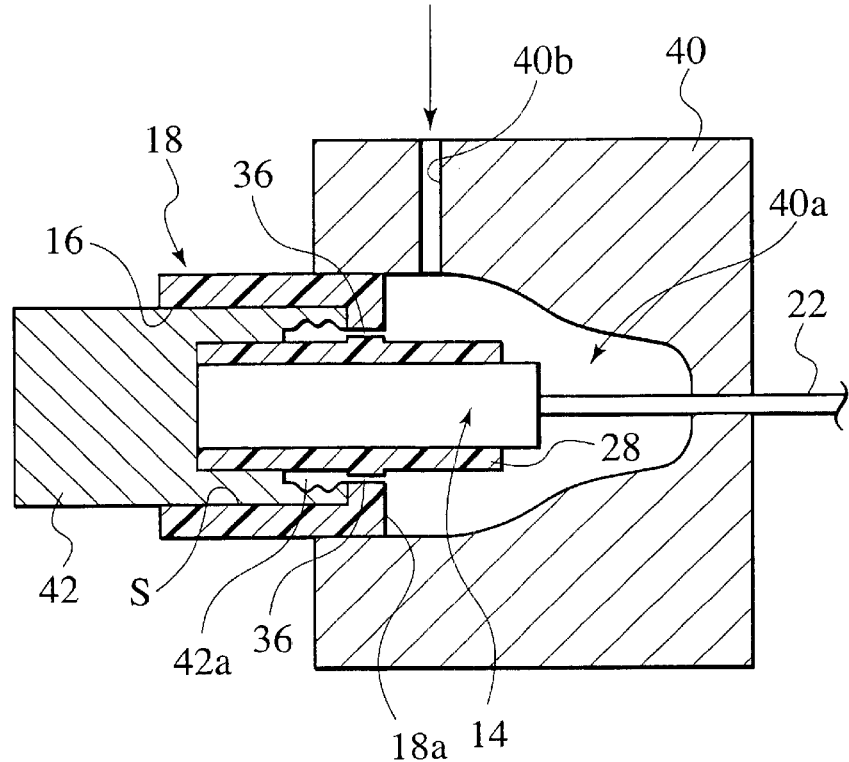
FIG. 5 is a sectional view of a molding die for injection molding of the waterproof connector of the embodiment of the present invention.
Figure 6:
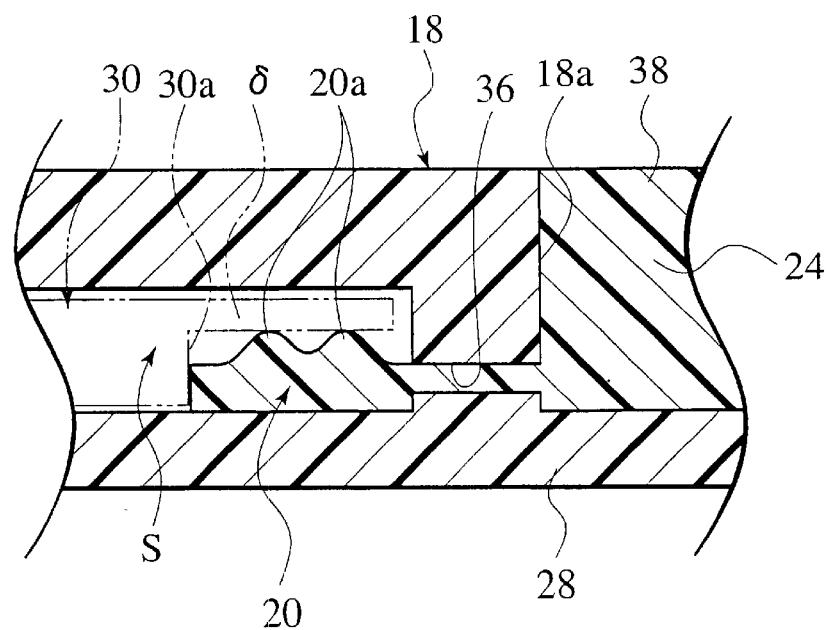
FIG. 6 is an enlarged sectional view of a portion A in FIG. 4.

FIGS. 3 to 6 show one embodiment of a structure of a waterproof portion of a waterproof connector according to the present invention: FIG. 3 is an exploded perspective view of the waterproof connector; FIG. 4 is a sectional view of an assembled state of the waterproof connector; FIG. 5 is a sectional view of a die for injection molding of the waterproof portion of the waterproof connector; and FIG. 6 is an enlarged sectional view of a portion A in FIG. 4.

As shown in FIGS. 3 and 4, a waterproof connector 10 includes: a synthetic resin-made inner housing 14 provided with a plurality of terminal chambers 12; a synthetic resin-made outer housing 18 with which the inner housing 14 is engaged, the outer housing 18 being provided with an enter port 16 receiving an opposite connector 30 at a tip thereof; an interconnector waterproof portion 20 provided in the outer housing 18, the interconnector waterproof portion 20 liquid-tightly sealing a space. between the waterproof connector 10 and the opposite connector 30; and a wire waterproof portion 24 covering connection portions (peripheral portion of press-connection terminals 23 to be described later) of wires 22 protruding outward from the terminal chambers 12.

As shown in FIG. 3, the inner housing 14 is monolithically molded from synthetic resin into an approximately flat rectangular parallelepiped shape, and a plurality (for example, four) of the terminal chambers 12 are arrayed at the rear thereof (right side in FIGS. 3 and 4). As shown in FIG. 4, the press-connection terminal (connection terminal) 23 for pressingly connecting the wire 22 is accommodated in each terminal chamber 12. Moreover, at the front end of the inner housing 14 (left side in FIGS. 3 and 4), corresponding to the press-connection terminals 23, insertion holes 14a are formed, each inserting thereinto a connection terminal (not shown) opposite thereto.

As shown in FIG. 3, the outer housing 18 is formed of synthetic resin into an approximately rectangular parallelepiped cylinder having a bottom, in which a block wall 18a is monolithically formed at the rear end thereof. And, on the block wall 18a, an approximately rectangular tube-shaped insertion port 28, into which the inner housing 14 is inserted and engaged, is formed. As shown in FIG. 4, this insertion port 28 is formed into an approximately rectangular tube shape protruding continuously inside and outside the block wall 18a. And, a length of the insertion port 28 is set approximately equal to that of the inner housing 14 in the inserting direction. Thus, the outer housing 18 is adapted to engage and hold the inner housing 14 inserted into the approximately rectangular tube-shaped insertion port 28. Moreover, the front end of the insertion port 28 is terminated at a position receding from the enter port 16 at the front end of the outer housing 18, and the front end of the insertion port 28 is adapted not to protrude from this enter port 16.

And, between an outer periphery of the insertion port 28 protruding into the outer housing 18 and an inner periphery of the outer housing 18, the specified space S for inserting the opposite connector 30 into the waterproof connector 10 is provided (see FIG. 4). Moreover, on the center of the upper surface of the outer housing 18, provided is locking means 32 elastically engaged and disengaged with the opposite connector 30.

As shown in FIG. 4, the interconnector waterproof portion 20 is formed into a ring shape substantially along the outer peripheral shape of the insertion port 28 located in the outer housing 18, and on an outer periphery of the interconnector waterproof portion 20, protrusively provided are protrusions 20a continuous in a circumference direction thereof. And, the interconnector waterproof portion 20 is located in the vicinity of the block wall 18a of the outer housing 18 in the space S, and surrounds and warps the outer periphery of the insertion port. 28. In addition, the interconnector waterproof portion 20 provides a gap δ thereof with the inner peripheral surface of the outer housing 18, and is adapted to have the tip of the opposite connector 30 plugged thereinto. In this case, when the interconnector waterproof portion 20 is compressed by a step portion 30a of the opposite connector 30 plugged thereinto as shown in FIG. 6, the interconnector waterproof portion 20 is expanded to the thickness direction, thus being adapted to seal a space between the outer peripheral surface of the insertion port 28 and the inner peripheral surface of the opposite connector 30.

As shown in FIG. 4, the wire waterproof portion 24 is formed into a shape covering the whole from the vicinity of the connection portion of the wire 22 to the press-connection terminal 23 to the block wall 18a provided at the rear end of the outer housing 18. Specifically, besides the portion where the wire 22 is taken outward from each terminal chamber 12, the wire waterproof portion 24 will cover the inside of each terminal chamber 12 and the portion where the inner housing 14 is inserted into the insertion port 28.

Here, in the block wall 18a of the outer housing 18, defined are through holes 36 as communication paths communicating between the interconnector waterproof portion 20 and the wire waterproof portion 24. And, through the through holes 36, the interconnector waterproof portion 20 and the wire waterproof portion 24 are adapted to be continuously formed by monolithic molding using thermoplastic polyamide resin 38 as thermoplastic resin. Moreover, as shown in FIG. 3, the foregoing through holes 36 are formed in plural with an appropriate interval from one to another so as to surround a peripheral edge portion of the insertion port 28.

FIG. 5 shows a molding die for simultaneous injection molding of the interconnector waterproof portion 20 and the wire waterproof portion 24. This molding die includes: an outer die 40 in which a first cavity 40a for molding the wire waterproof portion 24 is defined; and an inner die 42 in which a second cavity 42a for molding the interconnector waterproof portion 20 is defined. As shown in FIG. 5, the outer die 40 is formed in such a manner that the outer housing 18 and the press-connection terminal 23 are set therein so that a peripheral portion from the rear end of the outer housing 18 to the connection portion of the wire 22 and the press-connection terminal 23 can be covered therewith. Then, the inner die 42 is inserted into the space S from the enter port 16 of the outer housing 18 so as to be set in the outer die 40.

And, the thermoplastic polyamide resin 38 in a melted state is injected from an injection molding machine (not shown) through an injection path 40b drilled in the outer die 40 into the first cavity 40a. Thus, the thermoplastic polyamide resin 38 is injected into the first cavity 40a, thereafter, passing through the plurality of through holes 36 of the outer housing 18, is injected into the second cavity 42a of the inner die 42. In this case, it is desirable that viscosity of the thermoplastic polyamide resin 38 in the melted state be selected in a range of 1000 to 7000 mpa.s in accordance with the purpose. Moreover, injection pressure is set constant so as to prevent the thermoplastic polyamide resin 38 from leaking from the inside of the inner housing 14 or the inner die 42 and from coming into the inside of the outer housing 18.

Then, the first and second cavities 40a and 42a are filled with the melted thermoplastic polyamide resin 38, which is then cooled to be cured in a shape along the first and second cavities 40a and 42a. Then, the outer die 40 and the inner die 42 are removed respectively after such curing. Thus, the thermoplastic polyamide resin 38 is monolithically molded into the inner housing 14 and the outer housing 18 with which the interconnector waterproof portion 20 and the wire waterproof portion 24 are engaged respectively.

In the structure of the waterproof portion of the waterproof connector 10 of this embodiment, which is thus configured, as shown in FIG. 4, the interconnector waterproof portion 20 of the waterproof connector 10 monolithically molded by the injection molding seals the space between the outer peripheral surface of the insertion port 28 and the inner peripheral surface of the opposite connector 30. Thus, waterproofed are the inside of the inner housing 14, that is, the electrical connection portion of the press-connection terminal 23 and a connection terminal opposite thereto, and the space between the waterproof connector 10 and the opposite connector 30 engaged therewith. Moreover, the wire waterproof portion 24 has a shape covering the whole from the block wall 18a provided at the rear end of the outer housing 18 to the press-connection portion of the wire 22 with the press-connection terminal 23 and the exposed portion of the wire 22 from the terminal chamber 12. Therefore, besides the vicinity portion where the wire 22 protrudes outward from the terminal chamber 12, the wire waterproof portion 24 seals the inside of the terminal chamber 12 and the portion where the inner housing 14 is inserted into the insertion port 28, thus securing the waterproof of the rear end of the waterproof connector 10. Moreover, since the wire waterproof portion 24 can increase bond strength between the block wall 18a and the inner housing 14, support rigidity of the inner housing 14 is increased, thus also making it possible to eliminate poor electrical contact caused by a mechanical backlash.

Moreover, since the interconnector waterproof portion 20 and the wire waterproof portion 24 are formed continuously and simultaneously by the monolithic molding using the thermoplastic polyamide resin 38, the interconnector waterproof portion 20 and the wire waterproof portion 24 can be provided as one part, the conventional sealing member such as a packing and a rubber stopper is saved, and for this amount, the number of parts of the whole waterproof connector 10 can be reduced, thus making it possible to achieve further cost reduction.

Furthermore, since the interconnector waterproof portion 20 and the wire waterproof portion 24 can be formed in a lump by the monolithic molding, this monolithic molding leads to assembly completion thereof, thus enabling the number of assembling steps to be reduced. Hence, the productivity of the waterproof connector 10 can be enhanced, and the product unit price can be reduced.

Note that, in this embodiment, description has been made for the case where the melted thermoplastic polyamide resin 38 is supplied from the first cavity 40a of the outer die 40 through the through holes 36 to the second cavity 42a of the inner die 42 when the interconnector waterproof portion 20 and the wire waterproof portion 24 are monolithically molded by use of the outer die 40 and the inner die 42 shown in FIG. 5. However, on the contrary to this, the thermoplastic polyamide resin 38 can be injected from the second cavity 42a to the first cavity 40a. In this case, since the through holes 36 formed in the block wall 18a are provided in plural so as to surround the insertion port 28, the thermoplastic polyamide resin 38 can be evenly supplied from the first cavity 40a to the second cavity 42a in the case of such supply. Therefore, a void can be prevented from entering the interconnector waterproof portion 20. Moreover, also in the case of supplying the thermoplastic polyamide resin 38 from the second cavity 42a to the first cavity 40a, a void can be prevented from entering the wire waterproof portion 24 similarly.

Moreover, in this embodiment, description has been made for the case where the interconnector waterproof portion 20 is expanded to the thickness direction by the compression thereof in the insertion direction to exert a sealing function; however, the structure of the interconnector waterproof portion 20 is not limited to this. It is satisfactory if only the sealing property between the inner housing 14 and the opposite connector 30 can be secured. For example, a structure may be adopted, in which the sealing function can be exerted only by compression obtained when the interconnector waterproof portion is pressed to the block wall 18a at the tip of the opposite connector 30. Furthermore, in this embodiment, the thermoplastic polyamide resin 38 is used as thermoplastic resin; however, as a matter of course, the thermoplastic resin is not limited to this.

As described above, according to the invention of claim 1, since the interconnector waterproof portion and the wire waterproof portion are continuously formed by the monolithic molding using the thermoplastic resin, the interconnector waterproof portion and the wire waterproof portion can be provided as one part, and the number of parts of the whole waterproof connector can be reduced. Moreover, since the interconnector waterproof portion and the wire waterproof portion can be formed in a lump by the monolithic molding, the number of assembling steps can be also reduced. Thus, the productivity of the waterproof connector can be enhanced, and the reduction of the production cost can be achieved.

According to the invention of claim 2, since the whole from the connection portion of the wire to the rear end of the outer housing is covered with the wire waterproof portion, the wire waterproof portion covers not only the connection portion of the wire but also the vicinity of the accommodating portion of the inner housing. Thus, a waterproof function of the portion covered by the wire waterproof portion can be enhanced, and the bond strength between the inner housing and the outer housing can be increased. Accordingly, the end portion of the waterproof connector can be securely waterproofed, and the support rigidity of the inner housing can be increased to eliminate the poor electrical connection caused by the mechanical backlash.

The entire content of a Japanese Patent Application No. P2000-331222 with a filing date of Oct. 30, 2000 is herein incorporated by reference.

Although the invention has been described above by reference to the preferred embodiment, the invention is not limited to the embodiment described above, and alterations and modifications without departing from the scope of the invention will occur to those skilled in the art, in light of the teachings. The scope of the invention is defined with reference to the following claims.

What is claimed is:

1. A structure of a waterproof portion of a waterproof connector comprising:
    an inner housing provided with a terminal chamber;
    an outer housing provided with an enter port receiving an opposite connector at a tip thereof, said outer housing having the inner housing engaged therewith and having a wall with a communication path extending therethrough;
    an interconnector waterproof portion sealing a space with said opposite connector, said interconnector waterproof portion being provided in the outer housing; and a wire waterproof portion covering a connection portion of a wire protruding outward from said terminal chamber, said wire waterproof portion being communicated with said interconnector waterproof portion through said communication path and being molded monolithically together with said interconnector waterproof portion using thermoplastic resin via said communication path.

2. The structure of the waterproof portion of the waterproof connector according to claim 1, wherein said wire waterproof portion is formed in such a manner that the thermoplastic resin covers the structure between said connection portion of said wire and a rear end of said outer housing.

* * * * *